United States Patent
Pierson

(10) Patent No.: US 6,873,142 B2
(45) Date of Patent: Mar. 29, 2005

(54) TRANSFORMER OVER-CURRENT PROTECTION WITH RMS SENSING AND VOLTAGE FOLD-BACK

(75) Inventor: Martin Pierson, Howell, MI (US)

(73) Assignee: Lionel L.L.C., Chesterfield, MI (US)

( * ) Notice: Subject to any disclaimer, the term of this patent is extended or adjusted under 35 U.S.C. 154(b) by 0 days.

(21) Appl. No.: 10/846,379

(22) Filed: May 14, 2004

(65) Prior Publication Data

US 2004/0207265 A1 Oct. 21, 2004

Related U.S. Application Data

(62) Division of application No. 10/177,703, filed on Jun. 21, 2002, now Pat. No. 6,813,124.

(51) Int. Cl.[7] .............................................. G05F 5/00
(52) U.S. Cl. ..................................................... 323/299
(58) Field of Search ................................ 323/299, 300, 323/303; 363/50, 55, 56.01, 56.03; 361/18, 35, 87, 93.9; 307/17, 31, 33, 35

(56) References Cited

U.S. PATENT DOCUMENTS

| | | | |
|---|---|---|---|
| 4,405,904 A | * | 9/1983 | Oida et al. ..................... 331/87 |
| 4,459,529 A | * | 7/1984 | Johnson ........................ 318/729 |
| 4,855,656 A | | 8/1989 | Saitoh et al. |
| 5,124,875 A | | 6/1992 | Ishii et al. |
| 5,818,670 A | | 10/1998 | Ahn |
| 5,838,555 A | * | 11/1998 | Lejeune et al. ................ 363/49 |
| 5,907,463 A | | 5/1999 | Choi |
| 6,087,782 A | | 7/2000 | Majid et al. |
| 6,281,606 B1 | | 8/2001 | Westlake |

* cited by examiner

Primary Examiner—Matthew V. Nguyen
(74) Attorney, Agent, or Firm—O'Melveny & Myers LLP

(57) ABSTRACT

A method for selectively enabling flow of current to a load from an alternating current supply signal connected to the load is presented. The method includes storing a first time passing between a zero-crossing of the supply signal, the first zero-crossing indicating a leading edge of the signal, and a second zero-crossing of the supply signal, the second zero-crossing indicating a trailing edge of the supply signal. The method further includes sending a first signal enabling flow of the current according to a desired conduction angle when a subsequent zero-crossing indicating the leading edge of the supply signal does not occur within a second time, the second time being at least as long as the first time.

4 Claims, 3 Drawing Sheets

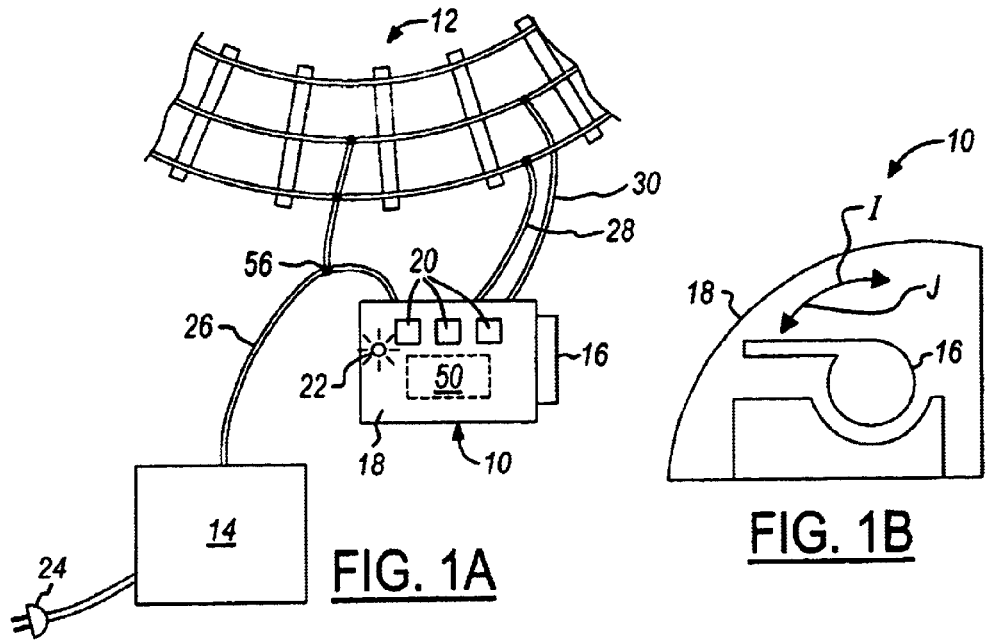
FIG. 1A
FIG. 1B
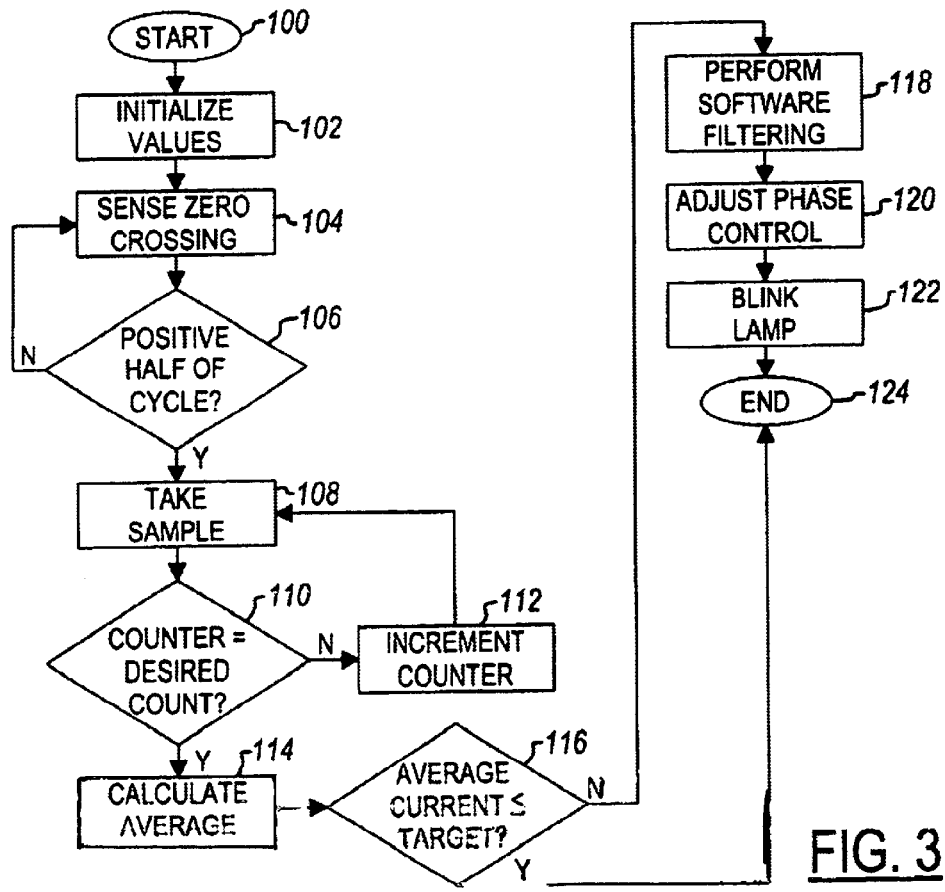
FIG. 3

TRANSFORMER OVER-CURRENT PROTECTION WITH RMS SENSING AND VOLTAGE FOLD-BACK

CROSS REFERENCE TO RELATED APPLICATIONS

This application is a divisional application of and claims priority to U.S. patent application Ser. No. 10/177,703 entitled "TRANSFORMER OVER-CURRENT PROTECTION WITH RMS SENSING AND VOLTAGE FOLD-BACK", filed Jun. 21, 2002 now U.S. Pat. No. 6,813,124, and hereby incorporated by referenced in its entirety.

BACKGROUND OF THE INVENTION

1. Technical Field

The invention relates to over-current protection of a transformer supplying one or more loads and, in particular, to over-current protection of a transformer supplying power to model electric trains.

2. Discussion of Related Art

Conventionally, transformers are used to adapt the available electrical supply from a generator, power supply or the common alternating current wall outlet to the voltage, current and power levels required by an electrical apparatus. A fuse is generally located in line with the primary of the transformer. When the fuse reaches a certain current level, it opens, protecting the transformer from overloads that may damage it permanently, such as overheating of the insulation. In many applications opening, or blowing, the fuse is undesirable. In these applications, the simple protection afforded by such a fuse has been supplemented by electronic protection.

One such application is in the operation of model toy trains. In this consumer electronics application, a blown fuse disables the use of the train until the fuse is replaced. Such fuses are generally not easily accessible or replaceable by the consumer. Electronic controls designed to minimize the current through the transformer to levels below the operation of the fuse protect the transformer from overloads without operation of the fuse. These controls can additionally protect other internal devices from excessive heat and power and provide a more enjoyable experience for the consumer.

SUMMARY OF THE INVENTION

Accordingly, an accurate apparatus and method of determining the load through a transformer is needed that provides appropriate over-current protection without appreciable reduction in the performance in the loads connected to the transformer. An inventive apparatus and method for more accurately performing phase control of the loads is also desirable, whether in combination with over-current protection or not.

Thus, the present invention includes a method for over-current protection of a transformer supplying an alternating current supply signal to a load. The method includes periodically sampling a current supplied to the load by the supply signal during a cycle of the supply signal, calculating a root-mean-squared (RMS) average current using the samples collected during the cycle, comparing the RMS average current to a target current for the cycle, and limiting an amount of power intended for the load during a subsequent cycle of the supply signal to the lower of a desired power value and an RMS average power value, the RMS average power value determined by the comparison of the RMS average current to the target current.

The invention also includes a method for selectively enabling flow of current to a load from an alternating current supply signal connected to the load. This method includes storing a first time passing between a first zero-crossing of the supply signal, the first zero-crossing indicating a leading edge of the supply signal, and a second zero-crossing of the supply signal, the second zero-crossing indicating a trailing edge of the supply signal, and sending a first signal enabling flow of the current according to a desired conduction angle when a subsequent zero-crossing indicating the leading edge of the supply signal does not occur within a second time, the second time being at least as long as the first time.

In a train controller for a model toy train wherein the train controller includes means for selectively enabling flow of an alternating current from a supply signal to a train track, an improvement of the present invention includes means for storing a first time passing between a first zero-crossing of the supply signal and a second zero-crossing of the supply signal, the first zero-crossing indicating a leading edge of the supply signal, and the second zero-crossing indicating a trailing edge of the supply signal; and a first signal enabling flow of the alternating current through the device according to a desired conduction angle when a subsequent zero-crossing indicating the leading edge of the supply signal does not occur within a second time, the second time being at least as long as the first time.

The invention also includes an apparatus including a controller capable of performing a process for over-current protection of a transformer supplying an alternating current supply signal to a load. The process includes periodically sampling a current supplied to the load by the supply signal during a cycle of the supply signal, calculating an RMS average current using the samples collected during the cycle, comparing the RMS average current to a target current for the cycle and limiting an amount of power intended for the load during a subsequent cycle of the supply signal to the lower of a desired power value and an RMS average power value, the RMS average power value determined by the comparison of the RMS average current to the target current for over-current protection of a transformer supplying an alternating current supply signal to a load.

Other applications and details of the present invention will become apparent to those skilled in the art when the following description of the best mode contemplated for practicing the invention is read in conjunction with the accompanying drawings.

BRIEF DESCRIPTION OF THE DRAWINGS

The following features, advantages and other uses of the present invention will become more apparent by referring to the following detailed description and drawing in which:

FIG. 1A is a plan view of a standard model train configuration with an alternating current track signal supplied by a standard 80 watt transformer and including a train controller incorporating the control circuit of the present invention;

FIG. 1B is a side view of the train controller of FIG. 1A;

FIG. 3 is a flow diagram of the over-current protection routine according to the present invention.

DETAILED DESCRIPTION OF THE INVENTION

Figure 2:
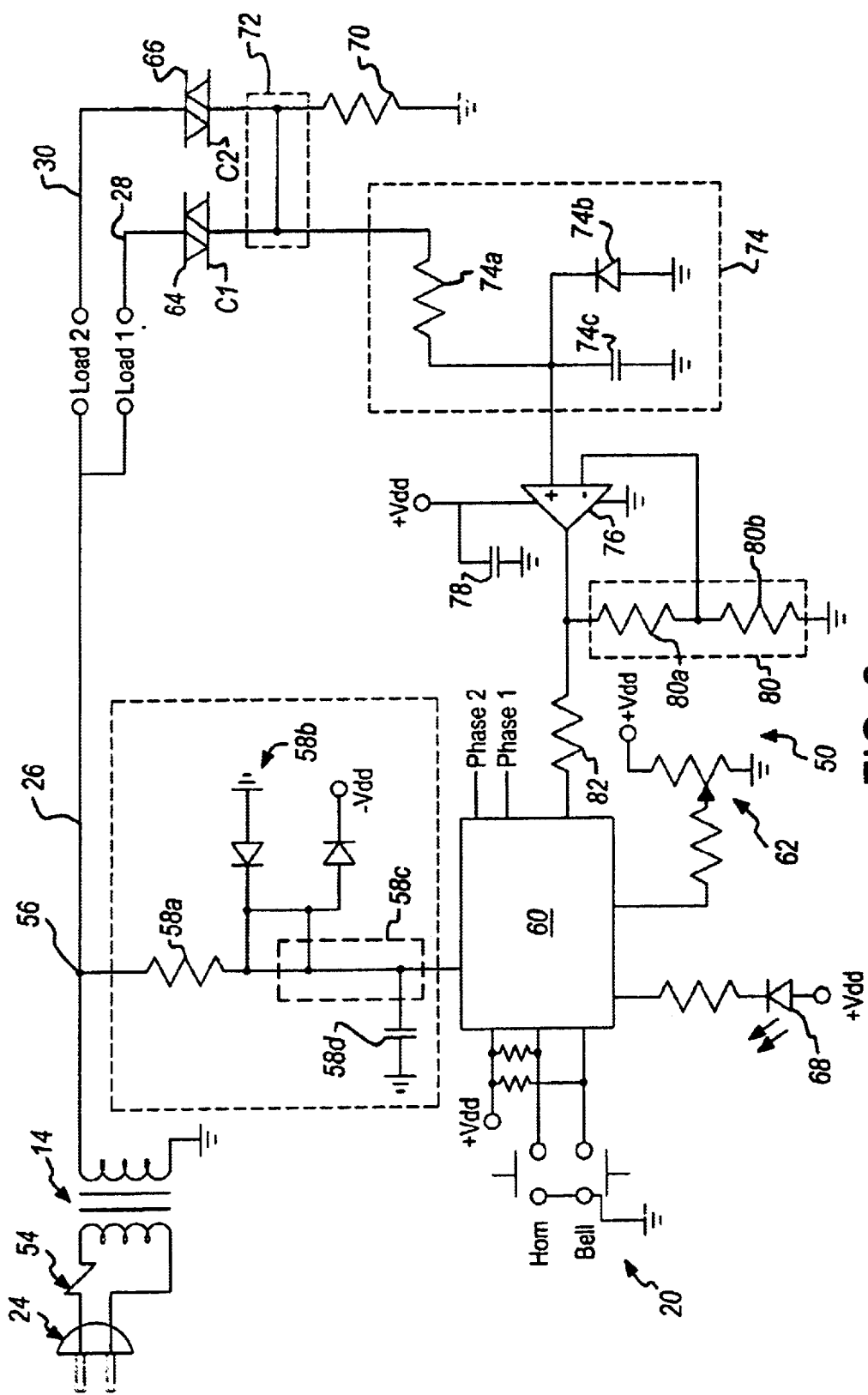
FIG. 2 is a simplified schematic diagram of the control circuit of FIG. 1A.

The present invention is over-current protection for a transformer, where one embodiment is shown in reference to FIGS. 1–4. In model train systems, a train controller, such as the simple train controller 10 shown in FIG. 1A, supplies voltages to the track 12 upon which one or more model trains (not shown) ride. Contacts on the bottom of each train, or metallic wheels of the train, pick up the power from the supply voltage signal 26 applied to the track 12 and supply it to an internal electrical motor of the train. Auxiliary loads can be supplied from another rail of the track 12. A transformer 14, not necessarily separate from the train controller 10, but shown so in FIG. 1, provides the supply signal 26 to the train controller 10, which controls both the amplitude and polarity of the voltage, controlling, for example, the speed and direction of the trains. A lever 16 rotatably mounted on a housing 18 of the train controller 10 allows the user to control a desired average power value supplied by the train controller 10 to the track 12 by movement of the lever 16 in the directions I and J shown in FIG. 1B. In an HO system, the supply signal used is a direct current (DC) signal. In the electrical train configuration described herein and shown in FIG. 1A, the transformer 14 provides an alternating current (AC) electric power supply signal to the track 12. Thus, when discussing average current and average power herein, a root-mean-squared (RMS) average is intended. An AC track signal supplied by the transformer 12 can be offset by a DC signal used to enable various train accessories, such as a horn, bell or whistle, through relays mounted on the train. In the simple train controller 10 shown in FIG. 1, pushbuttons 20 are mounted in the surface of the housing 18 to enable the user to indicate a desire to change the direction of trains, to sound a whistle and to sound a bell. A lamp 22 mounted in the housing 18 indicates operating conditions of the train controller 10. For example, the lamp 22 may show a light output that varies with the power level supplied to the load through the track 12. The housing 18 also encloses an electronic control circuit 50 of the train controller 10 that protects and controls the transformer 14 during operation.

The control circuit 50 for the transformer 14 taps the secondary of the transformer 14, as shown in FIG. 2. The transformer 14 can be an 80 watt transformer receiving a standard 120 volt AC supply at its primary through a connector 24 to, for example, a wall socket (not shown). A conventional fast blow fuse 54 is connected in series with the transformer 14 primary. The secondary of the transformer 14 supplies a voltage of generally twelve to 25 volts AC to the train track 12 and the train controller 10. The AC secondary supply signal 26 supplying the load, Loads 1 and 2, at the train track 12 is tapped at node 56 to a zero crossing detector 58. The zero crossing detector 58 includes a relatively high impedance resistor 58a, such as 100 kΩ, connected between the node 56 and a controller 60, which is shown as a microcontroller unit (MCU). Connected between the resistor 58a and the controller 60 are a pair of reverse-connected Schottky diodes 58b. The anode of one of Schottky diodes 58b is connected to ground, while the cathode of the other Schottky diode 58b is reverse biased at −Vdd volts DC, −5 volts DC by example. The common node 58c of the reverse-connected Schottky diodes 58b supplies a detection signal to the controller 60 after being filtered through a grounded capacitor 58d. Of course, one of skill in the art knows that there are a multitude of configurations that can perform zero crossing detection in place of the disclosed circuit design.

The controller 60 can be, as shown, a standard MCU 60, but a microprocessor unit (MPU) with peripheral memory chips, etc., can be used in place of a microcontroller. Further, although the use of an MCU or MPU is preferred, the functions herein described with respect to the controller 60 can be performed in whole or in part by equivalent analog and/or digital circuitry. Although many equivalents can be used as the controller 60, the description herein refers to the controller 60 as the MCU 60 to more easily distinguish the controller 60 from the train controller 10. The MCU 60 controls, by example, the response to horn and bell pushbuttons 20, which are shown conventionally connected to the MCU 60 in FIG. 2. The MCU 60 also controls an LED 68 that lights the lamp 22 embedded in the housing 18 of the train controller 10. The MCU 60 receives an input signal based upon the setting of a potentiometer 62, which is responsive to the movement of the lever 16. In response to changes in the impendence of the potentiometer 62, the MCU 60 calculates a phase conduction angle for each of the triacs 64 and 66 connected to Loads 1 and 2, respectively. The phase conduction angle is the total angle over which the flow of current to the load occurs through the triacs 64, 66, delivering an average power from the transformer 14. Although the phase conduction angle of each of the triacs 64, 66 can be set in a variety of ways, one way to do so starts when all three pushbuttons 20 are held down, placing the transformer in programming mode. In this mode, one of the triacs, such as triac 66 for Load 2, is controlled by the lever 16. As the lever 16 moves upwards in the direction I, the phase signal Phase 2 to Load 2 increases the conduction angle of the triac 66, thus increasing the average power supplied to the Load 2. Similarly, as the lever 16 moves downwards in the direction J, the phase signal Phase 2 decreases the conduction angle of the triac 66, decreasing the average power supplied to the Load 2. Once the lever 16 is at the desired setting for Load 2, releasing the pushbuttons 20 stores the setting for Load 2. Returning the lever 16 to zero output causes the MCU 60 to control the average power supplied to Load 1 through the triac 64 using the lever 16 by movement in the directions I and J as previously described, while the MCU 60 controls the triac 66 according to the stored setting. The conduction signals that control the conduction angles are shown in FIG. 2 as C1 and C2, which are respectively connected to the gates of the triacs 64 and 66. The phase signals Phases 1 and 2 are filtered to become conduction signals C1 and C2 by known circuitry, so the circuitry will not be described herein. Although only two loads controlled by respective triacs 64 and 66 are shown, the invention can be used with more or less than two loads. The conduction angles of the triacs 64, 66 are often different, and they can be controlled by two levers as opposed to being controlled by one potentiometer 62.

The triacs 64 and 66 are respectively connected on one end to Loads 1 and 2 through connections 28 and 30. The other ends of each triac 64, 66 are commonly connected to the voltage-fold-back circuit at node 72. A sensing wire 70 is connected to ground on one end, and on the other end, the sensing wire 70 is connected to the node 72 so as to receive a complex voltage wave proportional to the current supplied to the Loads 1, 2. Also at the common node 72, an input impedance 74 performing a filtering function for the non-inverting input of an operational amplifier (op amp) 76 is connected. The input impedance 74 comprises a resistor 74a connected at one end to the common node 72 and at the other end to the non-inverting input of the op amp 76. A cathode of a diode 74b is also connected to the non-inverting input of the op amp 76, while the anode of the diode 74b is grounded. A filtering capacitor 74c is connected in parallel with the diode 74b. As is standard, the op amp 76 is raised to the operating DC voltage+Vdd and is grounded. A grounded capacitor 78 is connected to the positive power supply of the op amp 76 to provide filtering for the supply voltage+Vdd. The op amp 76 has negative feedback at a gain created by resistors 80a and 80b. Specifically, resistors 80a and 80b are connected in series to ground at the output of the op amp 76, and the feedback from the inverting input of the op amp 76 taps the junction of resistors 80a and 80b. The output of the op amp 76 proceeds through a damping resistor 82, which provides input protection for the MCU 60.

In the most basic operation of the circuit, the current flowing to the Loads 1 and 2 during conduction through the triacs 64, 66 is sensed as a complex voltage waveform across the sensing wire 70. The voltage waveform representing the current flowing to Loads 1, 2 is fed through the linear operational amplifier 76 when an input channel of the MCU 60 performs its sampling, as discussed below. The input channel of the MCU 60 is an analog-to-digital (A/D) channel, which converts the amplified voltage waveform to a digital value. Alternatively, A/D circuitry could be added to the board of the control circuit 50 and the input provided to a digital channel input of the MCU 60. The MCU 60 samples a series of digital values to calculate an actual average current. Based upon a comparison of a target current, discussed herein, and the actual average current, the MCU 60 controls the phase signals Phases 1 and 2, controlling the average power, and thus the average current, drawn by the transformer 14 to supply the Loads 1 and 2.

More specifically, and as shown in FIG. 3, the over-current protection routine of the MCU 60 is continuously performed starting at 100, once current begins to flow. The routine starts by initializing values starting at 102. In this initialization, the sample counter of the MCU 60 is set equal to the starting count, usually 0. Also, the target current to be supplied to the load is set. The target current is a calculated average current based upon the lower of the desired average power setting, or value, of the potentiometer 62 or the average power value determined by the over-current protection routine on a previous iteration as described herein. Of course, when the train controller 10 is first turned on, this target current is based upon the desired power value as indicated by the setting of the potentiometer 62.

At 104, the zero crossing of the input signal is detected by the MCU 60 based on the input from the zero crossing detector 58. Advantageously, sampling occurs when the zero crossing detector 58 indicates that the supply signal 26 from the transformer 14 has passed from negative to positive polarity. At 106, this is reflected by the query as to whether the supply signal 26 is in the positive half of the cycle or not. If the signal 26 is not in the positive half of the cycle, i.e., it is in the negative half of the cycle, the MCU 60 awaits the next zero crossing signal from the zero crossing detector 58. When the supply signal 26 is in the positive half of the cycle, as indicated at 106, sampling starts at 108. As one of skill in the art recognizes, however, the conduction angles of the triacs 64, 66 are rarely the complete 180 degrees per half cycle. Thus, while testing can start immediately after zero crossing as described, testing can start later depending upon the actual conduction angles. Typically, to create a DC offset for horn and bell activation, conduction starts at about five degrees into each half cycle, but can start later if the average power setting of the potentiometer 62 is low.

A predetermined number of samples is taken at 108. Thus, after each sample is taken at 108, the routine advances to 110, where a query determines whether the counter, initialized at 102, has reached the desired number, or count, of samples. If the desired count has not been reached, the MCU 60 increments the counter by one and takes another sample at 108. This continues until the counter is equal to the desired count, i.e., the targeted number of samples has been reached, then the routine advances to 114, where the actual average current supplied through the triacs 64, 66 is calculated. It is useful to note that even though there is a target current, as specified at 102, the actual average current can exceed that target current based upon a number of factors such as faults, heavy start-up motor loads and supply voltage drops, for example, resulting in an over-current condition.

The number of samples and the interval between samples can vary based upon the operation of the train controller 10. For example, since current does not typically flow until several degrees past zero crossing, sampling does not have to begin immediately after the zero crossing detector 58 indicates to the MCU 60 that a zero crossing has occurred as previously mentioned. Ideally, the signals C1 and C2 no longer enable conduction at the end of each half cycle so testing could theoretically end at 180 degrees. Experiments have shown, however, that significant levels of current flow can result from the inductance of the transformer 14, continuing even after the conduction signals C1 and C2 would normally no longer enable the triacs 64, 66. Under certain circumstances, a total of five amps supplied to the Loads 1, 2 at up to 180 degrees was supplemented by up to three or four amps when measurement occurred up to about five to ten degrees past the negative zero crossing, that is, the zero crossing where the polarity of the input signal changes from positive polarity to negative polarity, depending upon the average power setting and the resulting conduction angle. One set of circumstances where this can occur is where output terminals are mounted to the train controller 10 for the connections 28, 30 to each of the loads 1, 2, respectively. A short caused by a screwdriver across the output terminals, for example, will cause this current flow past zero crossing. This additional current flow during the period from about five to ten degrees after 180 degrees can be sufficient to blow the fast blow fuse 54 on the transformer 14 primary. Therefore, it is beneficial for the MCU 60 to sample the current until up to about five to ten degrees past 180 degrees, depending upon the conduction angles.

As seen from this discussion, a number of samples over the entire testing period is taken. A minimum sample number is desirable to arrive at an actual average current with any degree of accuracy. Testing has shown that a minimum number of samples of the input waveform is approximately eight samples. However, thirty-two samples gives a large enough sample base to arrive at an answer to several decimal places of accuracy. Additional samples can be taken, but accuracy is not greatly improved using the additional samples. The interval between samples taken over the testing period can be determined by a variety of methods. One advantageous method occurs where the MCU 60 uses the expected frequency of the input waveform, 60 Hz in the United States by example, and calculates the sampling interval based upon the number of samples that need to be gathered during the testing period, which is approximately half of a cycle. Other methods include setting a sampling interval based upon the minimum expected period, then testing for the zero crossing from positive to negative polarity. Instead of querying for a total desired number of samples at 110, the sampling continues until a certain period of time, or a certain number of samples past the zero crossing. This results in a more complicated routine as the number of samples potentially varies during each testing period. Other ways of performing the sampling over the testing period are possible.

The actual average current is calculated from the samples at 114. As mentioned previously, the average current is the RMS average current. The samples can be individually stored and the average calculated from the stored sample values or, alternatively, the sampled values can be accumulated while the sampling occurs, and then the average can be calculated. In its simplest embodiment, the average current calculated at 114 is compared to the target current at 116. If this actual average current calculated at 114 is less than or equal to the target current in response to the query at 116, then the LED 68 stops blinking at 117 if it was previously blinking as a result of the operation of the over-current protection routine as discussed herein. The routine then ends at 124. The routine begins again at 100 and repeats as long as the train controller 10 is supplied power. This means that, in practice, the over-current protection routine runs during each cycle, taking samples mostly during the positive half of the input waveform and performing its calculations and adjustments for the next cycle during the negative half of the input waveform.

Returning now to 116, if the actual average current is greater than the target current, then this indicates that the phase control signals Phase 1, 2 need to be adjusted to reduce the average power supplied from the transformer 14 in order to reduce the average current. During operation, however, certain loads receiving input power from the transformer 14 can draw odd input waveforms based upon the characteristics of the load. For example, typical DC motors located in an engine locomotive do not demand large inrush currents to start. However, more modern AC motors may demand up to seven amps to start, then settle at a load of about two amps. Therefore, in determining the amount of the reduction, it is advantageous to incorporate software filtering into the over-current protection routine for this circumstance and others at 118. The software filtering is intended to distinguish between, for example, a direct short, that results in a very quick decrease in output voltage, with this startup current required by certain engines, which also results in a sudden drop of voltage. The software filtering of the MCU 60 can perform its function in a variety of ways using known techniques. The software filtering of the MCU 60 can, for example, compare the samples to a recognized pattern, or profile, for particular motors determined by testing. For example, if each of the samples is stored, a best fit curve can be compared against curves determined for a variety of loads using sampled data for each load. Alternatively, for example, peak and minimum values, as well as time between these values, etc., sampled during the test period can be used to determine the characteristics of the current curve from which to determine the response to the over-current condition by the MCU 60 at 120.

At 120, the phase signals Phases 1, 2 sent from the MCU 60 to the triacs 64 and 66 are adjusted to reduce the current flow supplied to Loads 1 and 2, respectively, by decreasing the conduction angles below the angles set by the prior average power setting at 102. Specifically, the MCU 60 controls the phase signals Phase 1 and Phase 2 that are filtered to become conduction signals C1 and C2 to enable the conduction through the triacs 64 and 66, respectively, later in each subsequent half cycle. These reductions are calculated by the MCU 60 and are based upon a desire to minimize the effect on the user of the reduction, while at the same time protecting the transformer 14 and other components including the blow fuse 54. To this end, when the actual average current exceeds that determined based upon the average power setting, the software filtering results in a minor decrease in the average power setting, just enough to keep the current under the target current determined by the prior average power setting at 102, whereas a direct short will result in a very quick decrease in the average power setting for the next cycle.

When the current is limited as a result of the over-current routine at 120, the LED 68 blinks to indicate activation of the over-current protection routine at 122. The routine then ends at 124. If the user requests an increase in average power by moving the lever 16 upwards in the direction I while the over-current routine is activated, the average power setting of the potentiometer 62 is raised. This new average power setting based on the setting of the potentiometer 62 is compared against the average power setting determined at 120 to determine the target current at 102 in the next iteration. Thus, if the lever 16 is used to request additional power while the over-current protection is activated to limit the average power setting, and hence the current, no change in the target current is made. If, however, the lever 16 is used to request additional power, and the over-current protection routine is not limiting the average power setting, the target current is based upon the new average power setting of the potentiometer 62. When the over-current protection routine is limiting the average power setting below the average power setting of the potentiometer 62, movement of the lever 16 downwards in the direction J to such a point where the average power setting of the potentiometer 62 is below the average power setting determined at 120 causes the LED 68 to stop blinking as previously discussed with respect to 117.

As mentioned, the inductance of the transformer 14 can result in the flow of current to the load occurring after 180 degrees of each half cycle of the supply signal 26. This can result in a problem in operating the transformer 14 during both normal and over-current conditions. Particularly where the conduction angle starts at an angle of less than five degrees, the effect of inductance can result in a shift in the zero crossing reference from the input signal to change, forcing the system timing to change and the system to become unstable. Another situation where this can occur is a short across the output terminals of the train controller 10 as previously discussed. The resulting timing change can also result in over-current conditions sufficient to blow the fast blow fuse 54. Therefore, it is beneficial to incorporate an inventive window detection routine into the software controlling the MCU 60, whether or not the over-current protection routine of the present invention is included. The window detection routine is designed to control the conduction angles to maintain the system timing. The last good trailing edge of the supply signal 26, i.e., where the voltage of the supply signal 26 passes from positive to negative polarity, is used to predict when the leading edge is supposed to occur, i.e., the change in the voltage of the supply signal 26 from negative to positive polarity. Then, the conduction of the triacs 64, 66 is enabled according to that determined by the average power setting, even if the zero crossing detector 58 does not detect a zero crossing.

Figure 4:
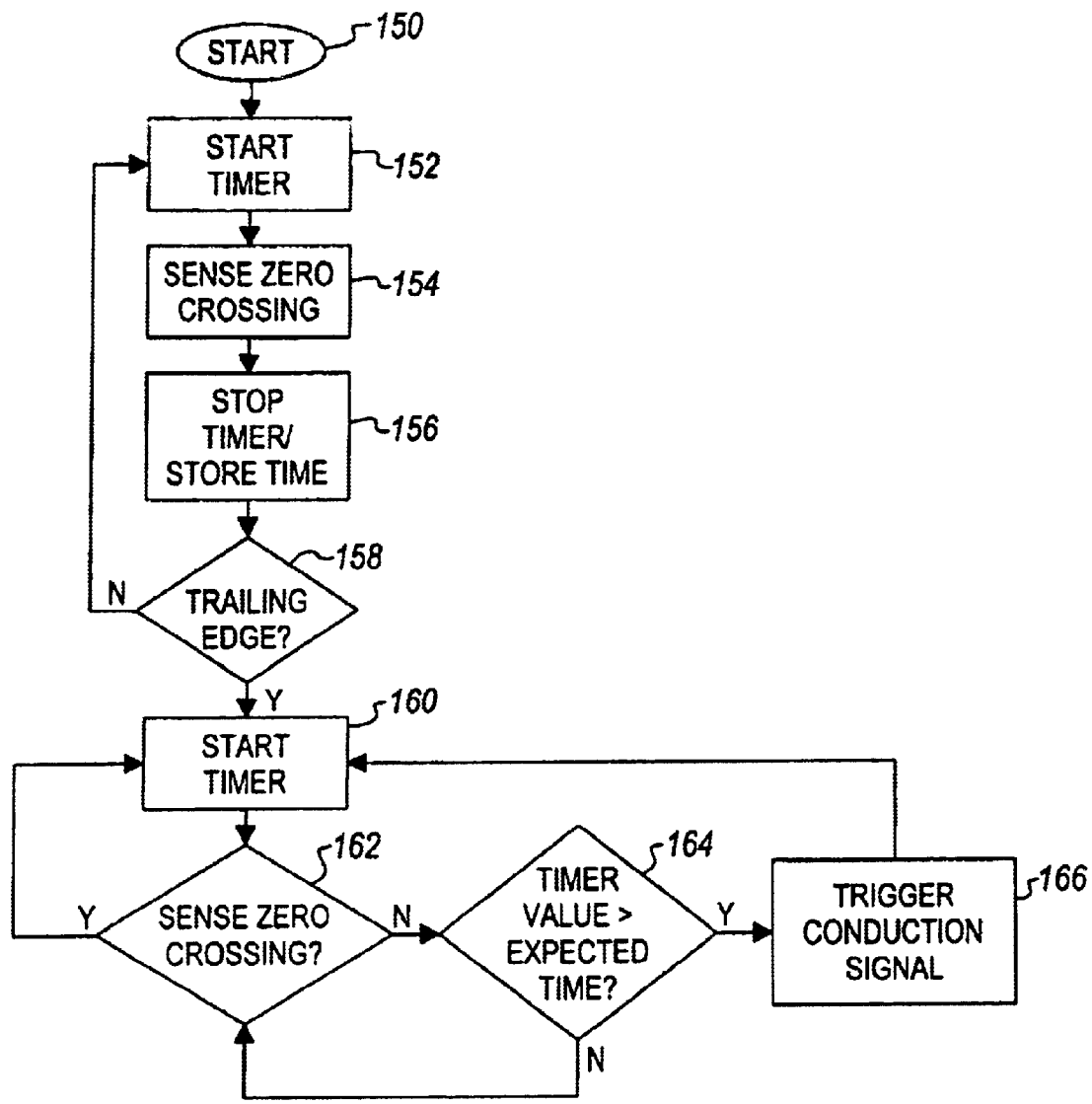
FIG. 4 is a flow diagram of the window detection routine according to the present invention.

One way of implementing the window detection routine is shown in FIG. 4. The routine starts at 150, when power is supplied to the train controller 10. The window detection routine can run concurrently with the over-current protection routine previously described. A timer of the MCU 60 starts at 152 and continues to increment at 154 until a zero crossing is sensed by the zero crossing detector 58. The routine then advances to 156, where the MCU 60 stops the timer and stores the resulting time. The MCU 60 then determines whether that zero crossing indicated a trailing edge or not at 156. If the supply signal 26 was not going from positive polarity to negative polarity at the detected zero crossing, then the routine returns to 152, where the timer starts keeping track of the amount of time that passes to the next zero crossing.

Returning now to 158, if the zero crossing detector 58 detects a zero crossing of the trailing edge, the routine proceeds to 160, where the MCU 60 again starts a timer. The MCU 60 continuously checks for a zero crossing at 162. Each time a zero crossing is not sensed at 162, the value of the timer is compared to an expected time based upon the stored time. For example, the expected time could be the stored time plus a small amount of time reflecting expect minor variations in the supply signal 26. If the timer value is less than the expected time at 164, the zero crossing is not expected. The MCU 60 continues to monitor for the sensed zero crossing at 162. Returning to 162, if the zero crossing detector 58 indicates a zero crossing, the timer starts again at 160. The conduction signals trigger conduction of the triacs 64, 66 according to the normal operation of the MCU 60.

Returning now to 164, if the timer value exceeds the expected time, the train controller 10 can become unstable unless the timing is maintained. Therefore, the routine advances to 166, where the MCU 60 sends phase signals Phases 1, 2 to cause conduction signals C1 and C2 to enable conduction across the triacs 64, 66 at conduction angle determined according to the average power setting of the train controller 10, whether the average power setting is based upon the potentiometer 62 setting or the average power setting determined by the over-current protection routine. The routine again returns to 160 to start the timer of the MCU 60 and again await the zero crossing point of the supply signal 26.

The inventive train controller 10 described herein can provide valuable over-current protection for a transformer 10 supplying power to a plurality of loads. The train controller 10 can prevent system instability resulting from errors in system timing due to the incorporation of a window detection routine, which can be separate from or incorporated with the over-current protection.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for selectively enabling flow of current to a load from an alternating current supply signal connected to the load, comprising:

storing a first time passing between a first zero-crossing of the supply signal, the first zero-crossing indicating a leading edge of the supply signal, and a second zero-crossing of the supply signal, the second zero-crossing indicating a trailing edge of the supply signal; and sending a first signal enabling flow of the current according to a desired conduction angle when a subsequent zero-crossing indicating the leading edge of the supply signal does not occur within a second time, the second time being at least as long as the first time.

2. The method according to claim 1, further comprising:

connecting a triac in a path of the alternating current supply signal, the triac selectively enabling flow of the current to the load from the supply signal; and wherein sending a first signal enabling flow of the current further comprises sending the first signal to the gate of the triac.

3. In a train controller for a model toy train, the train controller including a device for selectively enabling flow of an alternating current from a supply signal to a train track, the improvement comprising:

means for storing a first time passing between a first zero-crossing of the supply signal and a second zero-crossing of the supply signal, the first zero-crossing indicating a leading edge of the supply signal, and the second zero-crossing indicating a trailing edge of the supply signal; and a first signal enabling flow of the alternating current through the device according to a desired conduction angle when a subsequent zero-crossing indicating the leading edge of the supply signal does not occur within a second time, the second time being at least as long as the first time.

4. The improvement according to claim 3 wherein the storing means is a microcontroller and the device is a triac, the microcontroller applying the first signal to a gate of the triac.

* * * * *